US012711861B2

(12) United States Patent
Sakakibara

(10) Patent No.: US 12,711,861 B2
(45) Date of Patent: Aug. 18, 2026

(54) VEHICLE NOTIFICATION DEVICE, VEHICLE NOTIFICATION METHOD, AND STORAGE MEDIUM

(71) Applicant: TOYOTA JIDOSHA KABUSHIKI KAISHA, Toyota (JP)

(72) Inventor: Hiroyuki Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/884,594

(22) Filed: Sep. 13, 2024

(65) Prior Publication Data

US 2025/0209915 A1 Jun. 26, 2025

(30) Foreign Application Priority Data

Dec. 20, 2023 (JP) ................................ 2023-214651

(51) Int. Cl.
*G08G 1/0967* (2006.01)
*B60Q 9/00* (2006.01)
*G08G 1/0965* (2006.01)

(52) U.S. Cl.
CPC ............. *G08G 1/0967* (2013.01); *B60Q 9/00* (2013.01); *G08G 1/0965* (2013.01)

(58) Field of Classification Search
CPC .. G08G 1/0962; G08G 1/0968; G08G 1/0967; G08G 1/0965; G08G 1/09626; G08G 1/09623; G08G 1/096716; G08G 1/09675; G08G 1/096783; G08G 1/096741; G08G 1/096775; G08G 1/161; G08G 1/166; B60Q 9/00; B60Q 1/0035; B60Q 1/18; B60Q 1/444; B60Q 1/5037; B60Q 1/507; B60Q 1/543; B60Q 1/547; B60Q 5/005; B60Q 5/006; B60W 2050/143; B60W 50/14; B60W 30/0956; B60W 2556/50; B60W 40/10; B60W 10/30; B60W 2040/0881; B60W 2050/0083; B60W 2050/146; B60W 2520/10;

(Continued)

(56) References Cited

U.S. PATENT DOCUMENTS 9,835,468 B2 12/2017 Yoshitomi et al.
10,017,178 B2 7/2018 Morimoto et al.

(Continued)

FOREIGN PATENT DOCUMENTS

JP H09-002152 A 1/1997
JP 2010-041281 A 2/2010

(Continued)

*Primary Examiner* — Dionne Pendleton
(74) *Attorney, Agent, or Firm* — SoraIP, Inc.

(57) ABSTRACT

A vehicle notification device acquires the speed limit applied to the own lane based on the image data acquired by the camera device, and generates a notification sound from the buzzer when the host vehicle speed exceeds the speed limit. The vehicle notification device acquires the traveling environment sound in the vehicle cabin using the vehicle cabin microphone, and acquires the frequency band and the sound pressure of the traveling environment sound. Then, the vehicle notification device changes the "frequency band and sound pressure" of the notification sound generated from the buzzer in accordance with the frequency band and sound pressure of the acquired traveling environment sound.

6 Claims, 5 Drawing Sheets

(58) Field of Classification Search

CPC ....... B60W 2554/801; B60W 2556/45; B60W 2556/65; B60W 30/00; B60W 30/09; B60W 30/0953; B60W 30/18163; B60W 40/08; B60W 40/105; B60W 50/0097; B60W 50/082; B60W 50/085; H04R 2499/13; H04R 2430/01; H04W 4/40; H04W 4/90; H04W 12/06; H04W 4/12; H04W 4/44; H04W 4/48; H04W 4/70; H04W 76/50; H04W 84/18; G01C 21/26; G06V 20/58; G06V 20/597; G08B 25/08; G08B 21/00; G08B 21/182; G08B 25/004; G08B 25/009; G08B 25/016; G08B 25/10; G08B 7/06; H04S 7/303; B60N 2/0025; B60N 2/003; B60N 2/267; B60N 2230/20; B60N 2230/30; B60L 50/90; B60L 53/14; B60L 53/31; B60L 53/64; B60R 11/02; B60R 16/02; G06F 3/165; G06N 3/08; G06Q 20/102; G06Q 20/108; G06Q 20/36; G06Q 30/0207; G06Q 30/0261; G06Q 30/0266; G06Q 40/08; Y04S 30/14; Y02T 10/70; Y02T 10/7072; Y02T 90/12; Y02T 90/14; Y02T 90/16; Y02T 90/167; H04M 1/6075; H04M 1/72412; H04M 1/72418; H04M 11/04; H04H 20/86; G07C 5/006; G07C 5/0825

See application file for complete search history.

(56) References Cited

U.S. PATENT DOCUMENTS

| | | | | |
|---|---|---|---|---|
| 10,132,642 | B2 | 11/2018 | Yoshitomi et al. | |
| 10,679,077 | B2 | 6/2020 | Kinoshita et al. | |
| 11,010,624 | B2 | 5/2021 | Hayashi et al. | |
| 11,017,247 | B2 | 5/2021 | Hayashi et al. | |
| 11,117,595 | B2 | 9/2021 | Sasaki et al. | |
| 2008/0204256 | A1* | 8/2008 | Omi | G08B 21/06 340/575 |
| 2009/0179774 | A1* | 7/2009 | Mohan | G08G 1/0965 340/902 |
| 2017/0154229 | A1 | 6/2017 | Yoshitomi | |
| 2021/0247526 | A1* | 8/2021 | Kijima | B60K 35/22 |
| 2022/0063496 | A1 | 3/2022 | Matsumura et al. | |
| 2024/0371354 | A1* | 11/2024 | Lim | G10K 11/17823 |

FOREIGN PATENT DOCUMENTS

| | | | |
|---|---|---|---|
| JP | 2017-102665 | A | 6/2017 |
| JP | 2018-120352 | A | 8/2018 |
| JP | 2021-099539 | A | 7/2021 |
| JP | 2022-040532 | A | 3/2022 |

* cited by examiner

| ENVIRONMENTAL NOISE | HIGH AUDIBLE BUZZER | |
|---|---|---|
| FREQUENCY BAND f (Hz) | FREQUENCY BAND (Hz) | SOUND PRESSURE (dB) |
| f ≤ 125(Hz) | 1600(Hz)±50(Hz) | 57(dB) |
| 125(Hz) < f ≤ 1000(Hz) | 800(Hz)±50(Hz) | 57(dB) |
| 1000(Hz) < f | 450(Hz)±50(Hz) | 63(dB) |

FIG. 5

| ENVIRONMENTAL NOISE | | HIGH AUDIBLE BUZZER | |
|---|---|---|---|
| FREQUENCY BAND f (Hz) | SOUND PRESSURE P (dB) | FREQUENCY BAND (Hz) | SOUND PRESSURE (dB) |
| f ≤ 125(Hz) | P ≤ P1 | 1600(Hz)±50(Hz) | 57(dB) |
| | P1 < P ≤ P2 | | 60(dB) |
| | P2 < P | | 63(dB) |
| 125(Hz) < f ≤ 1000(Hz) | P ≤ P1 | 800(Hz)±50(Hz) | 57(dB) |
| | P1 < P ≤ P2 | | 60(dB) |
| | P2 < P | | 63(dB) |
| 1000(Hz) < f | P ≤ P1 | 450(Hz)±50(Hz) | 63(dB) |
| | P1 < P ≤ P2 | | 65(dB) |
| | P2 < P | | 67(dB) |

VEHICLE NOTIFICATION DEVICE, VEHICLE NOTIFICATION METHOD, AND STORAGE MEDIUM

CROSS-REFERENCE TO RELATED APPLICATION

This application claims priority to Japanese Patent Application No. 2023-214651 filed on Dec. 20, 2023, incorporated herein by reference in its entirety.

BACKGROUND

1. Technical Field

The present disclosure relates to a vehicle notification device, a vehicle notification method, and a storage medium for generating a notification sound for an occupant of a host vehicle.

2. Description of Related Art

A conventional device acquires image data by capturing an image of a scene in front of a host vehicle using an in-vehicle camera, and recognizes a road sign from the image data. Further, the conventional device generates a notification sound corresponding to the content of the recognized road sign for an occupant of the host vehicle as necessary (see Japanese Unexamined Patent Application Publication No. 2017-102665 (JP 2017-102665 A), Japanese Unexamined Patent Application Publication No. 2021-99539 (JP 2021-99539 A), and Japanese Unexamined Patent Application Publication No. (JP 2022-40532 A)).

SUMMARY

However, the conventional device does not determine the notification sound in consideration of a traveling environmental sound (such as noise in a vehicle cabin generated along with travel of the host vehicle and noise generated by an air conditioning device, for example, which is also simply referred to as an "environmental sound in the vehicle cabin"). Therefore, a notification sound at a high sound pressure is always generated so that the occupant of the vehicle can hear the notification sound, no matter what traveling environmental sound is generated. As a result, a driver may feel the notification sound annoying, particularly when the notification sound is generated at a high frequency. If the sound pressure of the notification sound is low, on the other hand, the driver may not notice the notification sound.

The present disclosure was made to address such an issue. That is, an object of the present disclosure is to provide a vehicle notification device, a vehicle notification method, and a storage medium that can generate a notification sound that is easily hearable by an occupant including a driver and that the occupant is less likely to feel annoying, by determining a frequency band of a notification sound in consideration of an environmental sound in a vehicle cabin and generating a notification sound in the determined frequency band.

An aspect of the present disclosure provides a vehicle notification device including a sound generation device (42) mounted on a host vehicle, and a controller (10, 40) that controls the sound generation device.

The controller is configured to:

acquire an environmental sound in a vehicle cabin of the host vehicle (S240);

determine a frequency band of a notification sound based on a frequency band of the acquired environmental sound (S250, S260); and execute notification operation to notify an occupant of the host vehicle that the host vehicle is in a predetermined state by causing the sound generation device to generate a notification sound in the determined frequency band (S270).

According to this aspect, the frequency band of the notification sound to be generated is determined based on the frequency band of the environmental sound in the vehicle cabin of the host vehicle, and thus it is possible to set the notification sound to a notification sound that is easily hearable by an occupant including a driver. As a result, it is not necessary to increase the sound pressure at all times, and thus it is possible to reduce the possibility that the occupant feels the notification sound annoying.

In this case, the frequency band and a sound pressure of the notification sound are preferably determined based on a sound pressure of the environmental sound in addition to the frequency band of the environmental sound (S410, S420). With this configuration, the frequency band and the sound pressure of the notification sound are determined based on the environmental sound, and thus it is possible to generate a more preferable notification sound.

In the above description, the names and/or signs used in the following embodiment are added in parentheses to the components of the disclosure corresponding to the embodiment, in order to facilitate understanding of the present disclosure. However, the constituent elements of the present disclosure are not limited to those according to the embodiment prescribed by such names and/or signs. The present disclosure also covers a vehicle notification method and a storage medium.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram of a vehicle notification device according to an embodiment of the present disclosure;

FIG. 3 is a look-up table stored in ROM of the driving assistance ECU shown in FIG. 1;

FIG. 5 is a look-up table stored in ROM of the modification of the driving assistance ECU shown in FIG. 1.

DETAILED DESCRIPTION OF EMBODIMENTS

Figure 1:
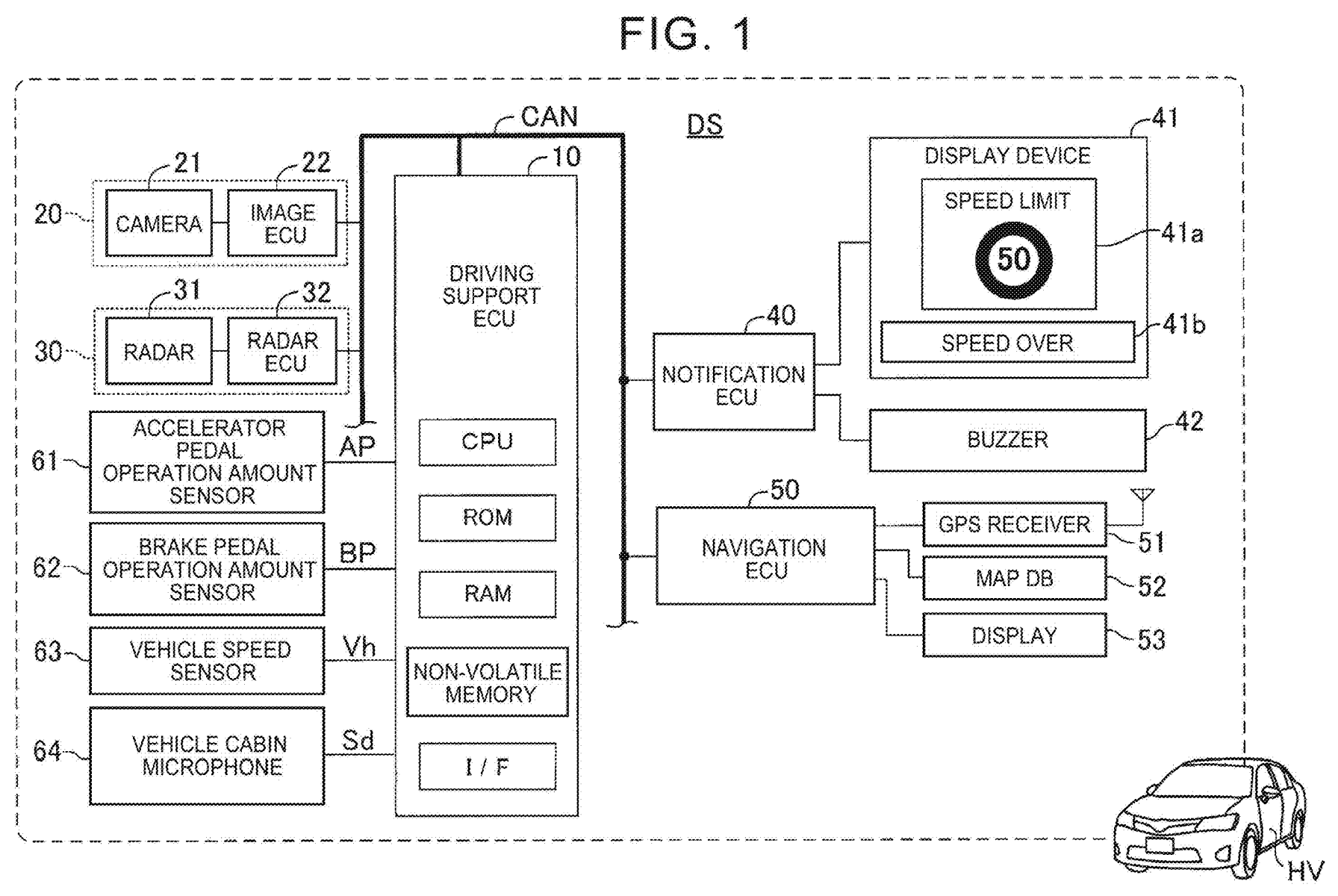
Figure 2:
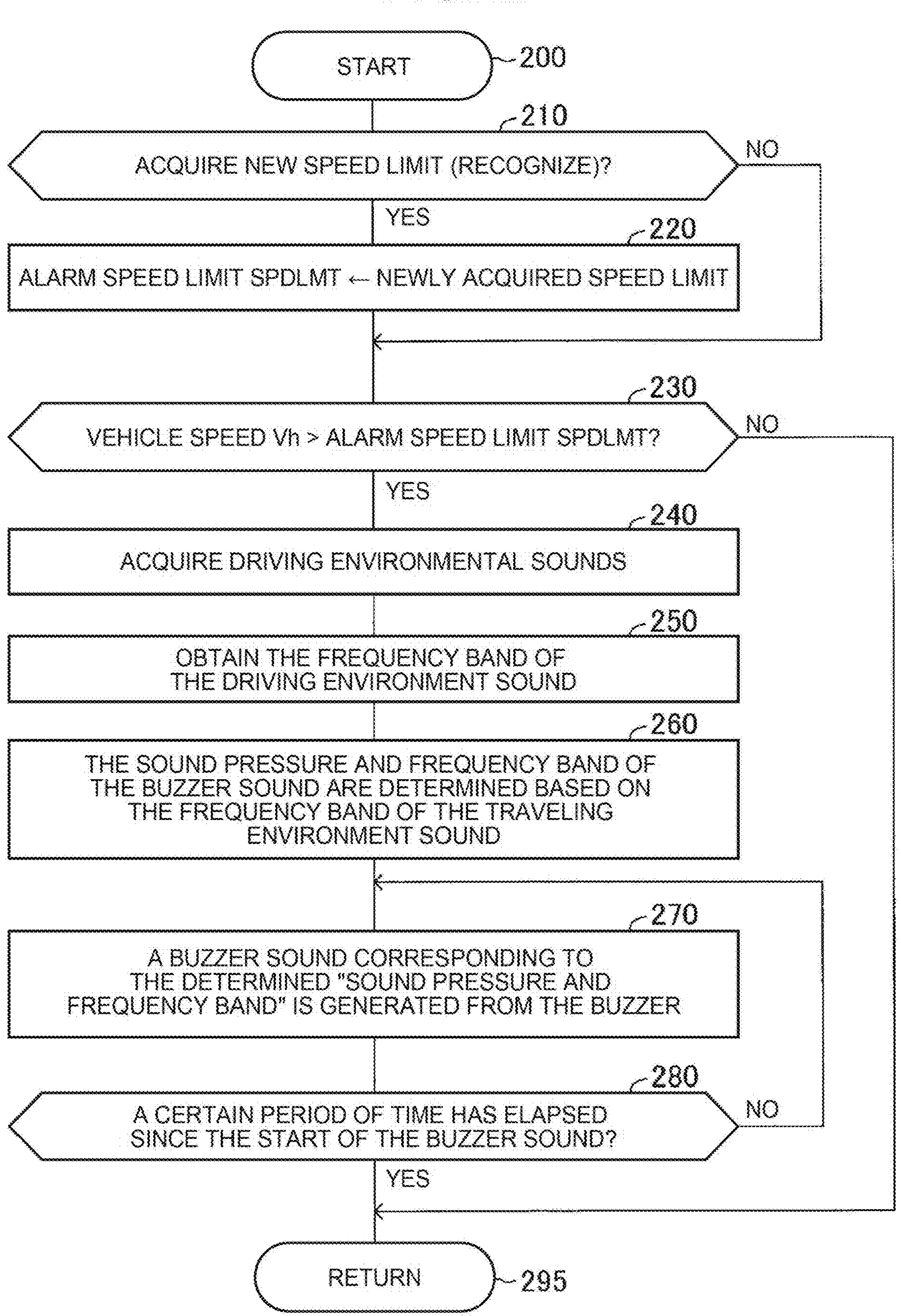
FIG. 2 is a routine executed by CPU of the driving assistance ECU shown in FIG. 1.

The "vehicle notification device DS (hereinafter, referred to as "device DS")" according to the embodiment of the present disclosure includes the components illustrated in FIG. 1, and is applied to (mounted on) the host vehicle HV. The host vehicle HV may be any of a vehicle using an internal combustion engine as a power source, a vehicle using an electric motor as a power source (that is, a battery electric vehicle), a hybrid electric vehicle, and the like.

As used herein, an "ECU" is an electronic controller (control unit) that includes a microcomputer that includes a CPU (processor), a ROM, a RAM, a data-writable non-volatile memory, an interface, and the like. Each of the ROM, the RAM, and the non-volatile memory is an example of a storage medium. A program of the present embodiment is stored in at least one of the storage media. ECU is also referred to as controllers or computers. The plurality of ECUs shown in FIG. 1 are connected to each other through a controller area network (CAN) so as to be able to exchange information. Some or all of these ECUs may be integrated into one ECU.

The driving assistance ECU 10 executes driving assistance control for generating a notification sound (alarm sound) to the driver on the basis of a road sign applied to a lane (hereinafter, referred to as "own lane") on which the host vehicle HV is traveling.

The camera device 20 includes a camera 21 and an image ECU 22. Each time a predetermined period of time elapses, the camera 21 captures a scene in front of the host vehicle HV and acquires image-data. The image ECU 22 generates "camera information including the image data itself, the camera target information, and the lane information" based on the image data from the camera 21, and transmits the camera information to the driving assistance ECU 10.

Based on the image data acquired by the camera device 20, the driving assistance ECU 10 extracts a "road sign indicating a speed limit (maximum speed)" included in the image data. The driving assistance ECU 10 recognizes (acquires) the numerical value indicated by the road sign as "speed limit (maximum speed) set/applied to the own lane". The image ECU 22 may recognize (acquire) the restricted vehicle speed.

The radar device 30 is a well-known device that acquires information about a target object existing in front of the host vehicle HV by using a millimeter-wave band radio wave, and includes a radar 31 and a radar ECU 32. Each time a predetermined time elapses, the radar 31 transmits millimeter waves within a predetermined detection range and receives millimeter waves reflected by the target object. The radar 31 transmits the transmitted and received millimeter-wave data to the radar ECU 32. The radar ECU 32 acquires radar information based on the information from the radar 31, and transmits the radar information to the driving assistance ECU 10. The radar information includes a distance to the target, an orientation of the target, a relative velocity of the target, and the like.

The notification ECU (alarm ECU) 40 is connected to a display device 41 disposed at a position visible from the driver's seat and a buzzer 42 that is a sound generation device that generates a notification sound (alarm sound), and controls these in accordance with an instruction (instruction signal) from the driving assistance ECU 10. The display device 41 is provided with an area 41*a* for displaying a speed limit (maximum speed) and an alarm display area 41*b* for displaying various alarm marks. The notification ECU 40 displays the speed limit included in the instruction from the driving assistance ECU 10 on the area 41*a*, and displays an alarm mark on the alarm display area 41*b* in response to the instruction from the driving assistance ECU 10. Further, the notification ECU 40 can generate a notification sound (buzzer sound) of the "frequency band and sound pressure" included in the instruction from the driving assistance ECU 10 from the buzzer 42.

The navigation ECU 50 is connected to a GPS receiver 51, a map database 52 storing map data, and a display touch panel 53 displaying touch buttons, and constitutes an in-vehicle navigation system. The navigation ECU 50 can acquire the current position of the host vehicle HV based on GPS received by GPS receiver 51, and acquire the speed limit set/applied to the host lane at the present time based on the acquired current position of the host vehicle HV and the map data stored in the map database 52.

The driving assistance ECU 10 receives the following "sensors and microphone" as detectors or outputs.

- An accelerator pedal operation amount sensor 61 for detecting an accelerator pedal operation amount AP of the host vehicle HV.
- A brake pedal operation amount sensor 62 for detecting a brake pedal operation amount BP of the host vehicle HV.
- The vehicle speed sensor 63 detects the speed of the host vehicle HV (that is, the host vehicle speed Vh).
- Vehicle cabin microphone 64 that convert the vehicle cabin environmental sounds, which are the sounds (noise) in the vehicle cabin of the host vehicle HV, into electric signals.

The vehicle cabin microphone 64 convert sounds in the vehicle cabin of the host vehicle HV and in the vicinity of the driver's seat into electric signals and output the electric signals. Hereinafter, the sound represented by the electric signal output from the vehicle cabin microphone 64 will be referred to as "traveling environment sound" for convenience.

Overview of Operation

The device DS acquires the speed limit applied to the own lane based on the image data acquired by the camera device 20.

On the other hand, the device DS acquires at least a frequency band of the traveling environment sound by analyzing the traveling environment sound acquired through the vehicle cabin microphone 64. The device DS determines the "frequency band and sound pressure" of the "audible (audible to the driver) and unobtrusive buzzer sound" based on the frequency band of the driving environmental sound.

When the host vehicle speed Vh exceeds the "acquired speed limit", the device DS generates a buzzer sound having the determined "frequency band and sound pressure" from the buzzer 42.

Specific Operation

In CPU of the driving assistance ECU 10 (hereinafter, simply referred to as "CPU"), the routine illustrated by the flow chart in FIG. 2 is executed every predetermined period (calculation cycle) dt elapses. Note that in the following, "step" may be referred to as "S".

At a predetermined timing, CPU starts the process from S200 of FIG. 2 and proceeds to S210. In S210, CPU determines whether the speed limit set for the own lane is newly acquired (recognized from the image) based on the image data transmitted from the camera device 20. CPU may acquire, via the navigation ECU 50, a speed limit set for the own lane from the present position of the host vehicle HV and the map information.

If the speed limit is newly acquired, CPU proceeds from S210 to S220 and stores the newly acquired speed limit as the alarm speed limit SPDLMT in RAM. At this time, CPU changes the speed limit displayed on the area 41*a* of the display device 41 to the alarm speed limit SPDLMT. CPU then proceeds to S230.

On the other hand, if the rate limit has not been newly acquired, S210 directly proceeds to S230.

CPU determines whether or not the host vehicle speed Vh detected by the vehicle speed sensor 63 is higher than the warning speed limit SPDLMT in S230. When the host vehicle speed Vh is equal to or lower than the warning speed limit SPDLMT, CPU proceeds directly from S230 to S295 and terminates the routine once.

On the other hand, when the host vehicle speed Vh is higher than the alarm-use speed limit SPDLMT, CPU determines "Yes" in S230, and sequentially executes the "S240 to S270 processes" described below. CPU then proceeds to S280.

The step 240: CPU uses the vehicle cabin microphone 64 to acquire the driving environmental noise.

The step 250: CPU performs waveform analysis of the traveling environment sound including the frequency analysis on the obtained traveling environment sound, and acquires the frequency band of the traveling environment sound.

The step 260: CPU determines the frequency band and the sound pressure of the buzzer sound based on the frequency band of the obtained traveling environmental sound. More specifically, the driving assistance ECU 10 stores the lookup table illustrated in FIG. 3 in a ROM. In this look-up table, a frequency band of the traveling environment sound and a "frequency band and sound pressure" of a buzzer sound that is audible (audible to the driver and/or the occupant) and is not troublesome to the driver and/or the occupant (hereinafter, simply referred to as "audible buzzer sound") are stored in association with each other. CPU applies the frequency band of the traveling environment sound acquired by S250 to the look-up table to determine the "frequency band and sound pressure" of the buzzer sound that is highly audible to the present traveling environment sound.

For example, according to the look-up table shown in FIG. 3, when the frequency band f of the obtained traveling environmental sound belongs to a low frequency band of 125 (Hz) or less, a buzzer sound having a high frequency band of "1600 (Hz)±50 (Hz)" and having a sound pressure (sound pressure level) of 57 (dB) is determined as a highly audible buzzer sound.

S270: CPU causes the buzzer 42 to generate a buzzer sound having the "frequency band and sound pressure" determined by S260 by transmitting an instruction to the notification ECU 40.

In S280, CPU determines whether or not a certain period of time has elapsed since S270 beeps. If a certain period of time has not elapsed since the start of the buzzer, CPU returns to S270.

When a certain period of time has elapsed from the time when the buzzer beeps in S270, CPU determines "Yes" in S280 and proceeds to step 295 to temporarily terminate the routine. As described above, CPU performs S270 and S280 processes to perform a notification operation of notifying the occupant (including the driver) of the host vehicle HV that the host vehicle HV is in a state (one of predetermined states) that the host vehicle is traveling in excess of the speed limit SPDLMT.

As described above, the device DS changes the frequency and the sound pressure of the buzzer sound generated when the vehicle speed exceeds the limit speed based on the frequency band of the traveling environmental sound so that the buzzer sound becomes a "highly audible buzzer sound". Therefore, the driver and the occupant can reliably hear the notification sound (buzzer sound), so that the driver and the occupant are hardly aware that the host vehicle HV is traveling at a speed exceeding the limit speed, and it is difficult to feel that the notification sound is troublesome.

Modification

Next, a modification of the above-described embodiment will be described. CPU according to this modification is different from CPU according to the above embodiment only in that the routine shown in FIG. 4 by the flow chart in place of FIG. 2 is executed. This difference will be described below. Incidentally, among the steps shown in FIG. 4, the steps that perform the same processing as the steps shown in FIG. 2 are denoted by reference numerals assigned to such steps in FIG. 2. Detailed description of such steps is omitted.

Figure 4:
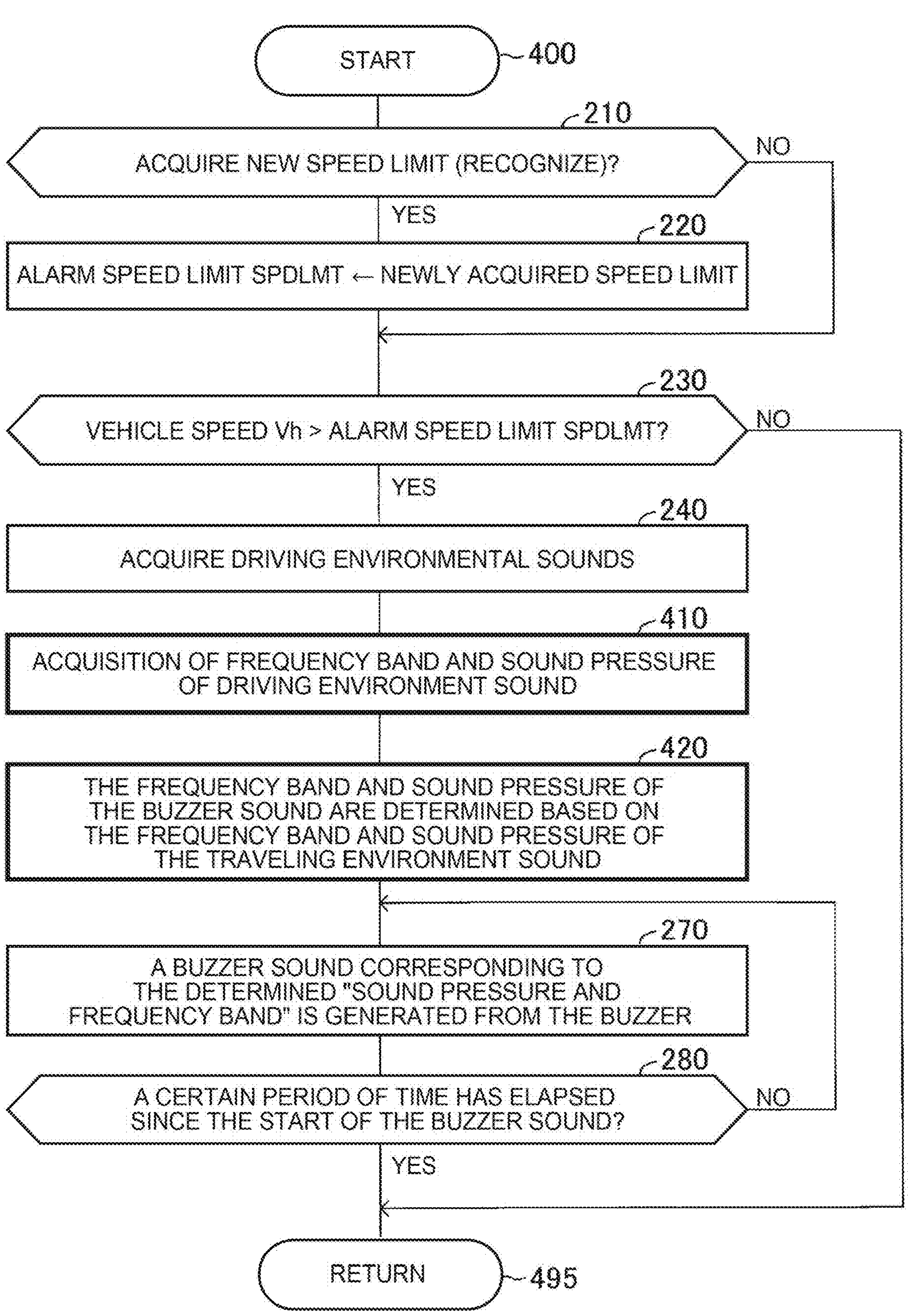
FIG. 4 is a routine executed by a CPU according to a modification of the driving assistance ECU shown in FIG. 1.

CPU proceeds to S240 of FIG. 4 to acquire the driving environmental noise when the host vehicle speed Vh is higher than the warning speed limit SPDLMT by the process of "S210 to S230" in FIG. 4.

Next, CPU proceeds to S410, and performs waveform analysis of the traveling environment sound including the frequency analysis on the acquired traveling environment sound, and acquires the frequency band and the sound pressure (sound pressure level) of the traveling environment sound.

Next, CPU proceeds to S420 and determines the frequency band and the sound pressure of the buzzer sound based on the frequency band and the sound pressure of the obtained traveling environmental sound.

More specifically, the driving assistance ECU 10 stores the lookup table illustrated in FIG. 5 in a ROM. In this look-up table, the "frequency band and sound pressure" of the traveling environment sound and the "frequency band and sound pressure" of the audible buzzer sound are stored in association with each other. CPU applies the "frequency band and sound pressure" of the traveling environment sound acquired by S410 to the look-up table to determine the "frequency band and sound pressure" of the buzzer sound that is highly audible to the present traveling environment sound.

For example, the frequency band f of the obtained traveling environment sound may belong to a low frequency band of 125 (Hz) or less, and the sound pressure P of the obtained traveling environment sound may be larger than the sound pressure P2. In this case, according to the look-up table shown in FIG. 5, a buzzer sound having a high frequency band of "1600 (Hz)±50 (Hz) and having a sound pressure (sound pressure level) of 63 (dB) is determined as a highly audible buzzer sound. According to the look-up table shown in FIG. 5, when the frequency band f of the traveling environment sound belongs to a certain frequency band, the sound pressure of the buzzer sound is determined so that the sound pressure of the buzzer sound increases as the sound pressure P of the traveling environment sound increases.

CPU then performs the "S270 and S280" process of FIG. 4 to cause the buzzer 42 to generate a buzzer sound having a "frequency band and sound pressure" determined at S420 for a period of time. That is, CPU executes a notification operation of notifying the occupant (including the driver) of the host vehicle HV that the host vehicle HV is in a state (one of predetermined states) in which the host vehicle is traveling exceeding the speed limit.

As described above, the device DS according to the modification determines the "frequency and sound pressure of the buzzer sound" based on not only the frequency band of the traveling environmental sound but also the sound pressure thereof. Therefore, the driver and the occupant can more reliably hear the notification sound (buzzer sound), and it is more difficult to sense that the notification sound is troublesome.

The present disclosure is not limited to the above-described embodiments and modifications, and various modifications can be adopted within the scope of the present disclosure.

For example, the present disclosure can be applied not only to a notification device that generates a notification sound (buzzer sound) when the host vehicle speed Vh exceeds the warning speed limit SPDLMT, but also to other devices. For example, the present disclosure can also be applied to a "notification device that notifies that the host vehicle HV is in a predetermined condition by generating a buzzer sound" in various driving support controls as described below.

(1) A notification device that recognizes a road sign of a particular type on the basis of image data, and generates a notification sound when the host vehicle HV does not comply with a traffic rule designated by the road sign. According to this notification device, for example, when the host vehicle HV fails to pause when a road sign of a particular type is instructed to "pause", a notification sound is generated because the host vehicle HV is "not in compliance with the traffic rule designated by the road sign".

(2) A notification device including an active cruise control (ACC: following vehicle distance control) system that generates a notification sound when a host vehicle HV is in a predetermined condition. For example, when the following vehicle-to-vehicle distance control is cancelled, a notification sound is generated by ACC device.

(3) A notification device including a pre-crash safety (PCS: collision avoidance support control). For example, when PCS device notifies the driver of the presence of an obstacle, a notification sound is generated.

(4) The notification device includes a clearance sonar system that generates a notification sound when a distance between the host vehicle HV and an obstacle becomes less than a threshold distance.

(5) Informing devices, including the Driver Drowsiness and Attention Warning (DDAW: Driver Sleepiness Attention Alert) system. For example, when the driver is determined to be in a doze state, a notification sound is generated by DDAW device.

(6) A notification device including a driver monitor system. For example, in a case where it is determined that the driver is driving in a forward direction, a notification sound is generated by the driver monitor system.

(7) A notification device including a lane departure control system (LDA). For example, when HV of the subject vehicle may deviate from the subject lane, a notification signal is generated by the lane deviation suppressing device.

(8) A notification device including a blind spot monitor (BSM) system. For example, when another vehicle is present in the blind spot area of the host vehicle HV or the other vehicle is approaching the blind spot area, a notification sound is generated by the blind spot monitor.

In the above-described embodiment and the modification, the driving assistance ECU 10 performs the waveform-analysis including the frequency-analysis of the traveling environmental sound. On the other hand, a measuring instrument that performs "frequency analysis and sound pressure measurement" such as a known noise measuring instrument may be provided between the vehicle cabin microphone 64 and the driving assistance ECU 10. Then, the driving assistance ECU 10 acquires information about the "frequency band and sound pressure of the traveling environmental sound" from the measuring instrument.

The device DS may cancel the traveling environmental sound by constantly transmitting a sound wave having a wave shape opposite to the wave shape of the traveling environmental sound to the vehicle cabin. Thus, the sound pressure of the notification sound (buzzer sound) can be further reduced.

Further, the present disclosure is applicable to a host vehicle HV in which the driving mode transitions from the autonomous driving to the driving by the driver in the autonomous vehicle.

What is claimed is:

1. A vehicle notification device comprising:

a sound generation device mounted on a host vehicle; and a controller that controls the sound generation device, wherein the controller is configured to acquire an environmental sound in a vehicle cabin of the host vehicle, via a vehicle cabin microphone that converts sounds in the vehicle cabin into electric signals, perform waveform analysis including frequency analysis of the acquired environmental sound and acquire a frequency band and a sound pressure of the environmental sound, determine a frequency band and a sound pressure of a notification sound based on the acquired frequency band and the acquired sound pressure of the acquired environmental sound by referring to a lookup table in which a plurality of frequency bands and a plurality of sound pressures of environmental sounds, and corresponding frequency bands and sounds pressures of notification sounds that are audible and unobtrusive to an occupant, are stored in association with each other, and execute a notification operation to notify an occupant of the host vehicle that the host vehicle is in a predetermined state by causing the sound generation device to generate a notification sound in the determined frequency band and the determined sound pressure.

2. The vehicle notification device according to claim 1, wherein the controller is configured to acquire a host vehicle speed that is a speed of the host vehicle, acquire a speed limit applied to a lane in which the host vehicle is traveling, and indicate that the host vehicle is traveling beyond the limit speed as the predetermined state by executing the notification operation when the host vehicle speed exceeds the limit speed.

3. The vehicle notification device according to claim 1, wherein, in a case where the acquired frequency band of the acquired environmental sound is equal to or lower than 125 (Hz) and the acquired sound pressure is higher than a predetermined threshold, the controller causes the sound generation device to generate a notification sound having a frequency band of 1600 (Hz)±50 (Hz) and a sound pressure of 63 (dB).

4. The vehicle notification device according to claim 1, wherein, in a case where the acquired frequency band of the acquired environmental sound is higher than 125 (Hz) and equal to or lower than 1000 (Hz) and the acquired sound pressure is higher than a predetermined threshold, the controller causes the sound generation device to generate a notification sound having a frequency band of 800 (Hz)±50 (Hz) and a sound pressure of 63 (dB).

5. The vehicle notification device according to claim 1, wherein, in a case where the acquired frequency band of the acquired environmental sound is higher than 1000 (Hz) and the acquired sound pressure is higher than a predetermined threshold, the controller causes the sound generation device to generate a notification sound having a frequency band of 450 (Hz)±50 (Hz) and a sound pressure of 67 (dB).

6. The vehicle notification device according to claim 1, wherein the controller is configured to cancel the environmental sound by transmitting a sound wave having a wave shape opposite to a wave shape of the environmental sound to the vehicle cabin.

* * * * *